Nov. 23, 1937.  R. SCHUBENEL  2,100,038
PLUG OR CORK FOR DELIVERING DOSES
Filed Dec. 26, 1935
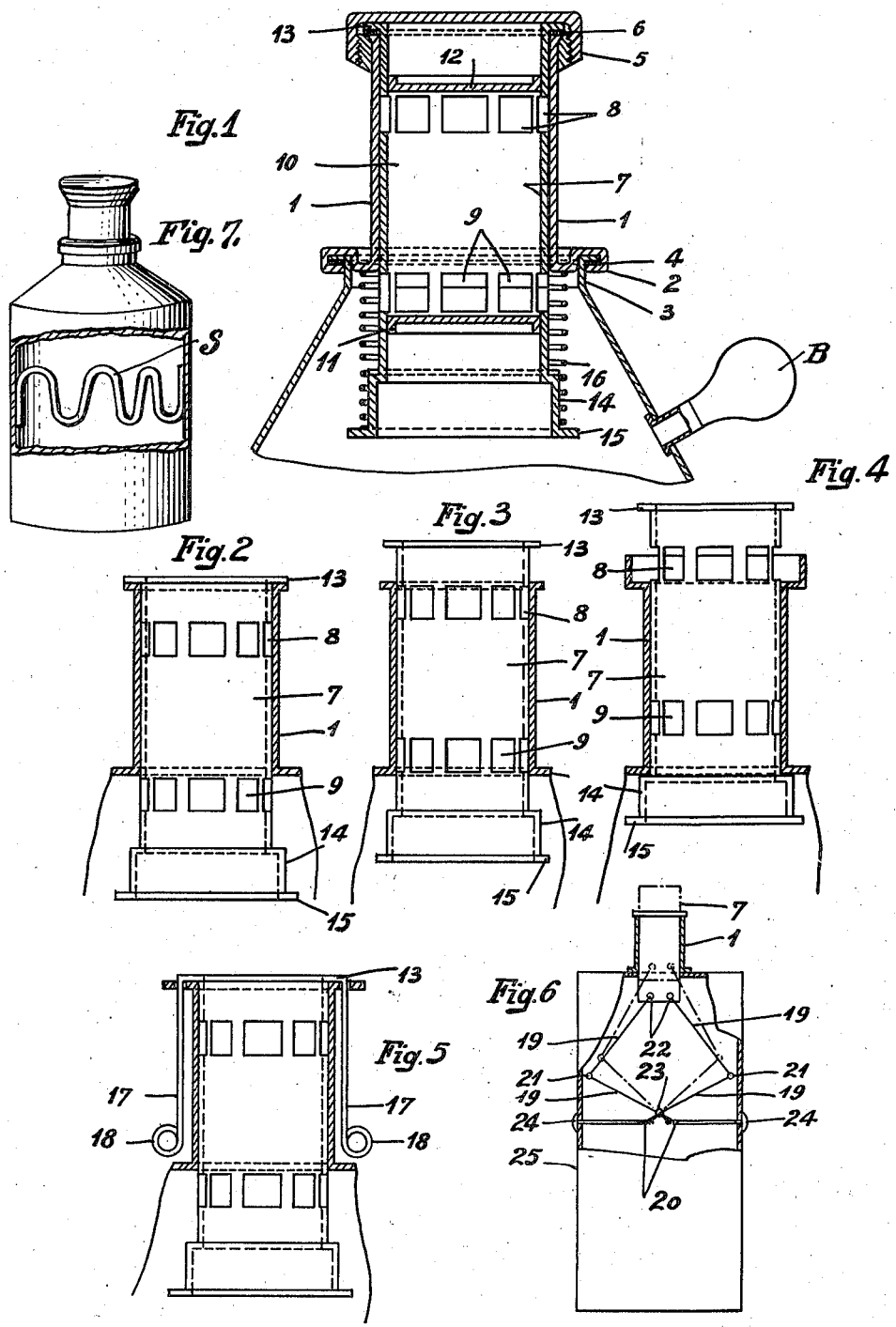

Patented Nov. 23, 1937

2,100,038

UNITED STATES PATENT OFFICE 2,100,038

PLUG OR CORK FOR DELIVERING DOSES

Robert Schubenel, Le Vesinet, France

Application December 26, 1935, Serial No. 56,277
In France December 28, 1934

8 Claims. (Cl. 221—104)

The object of the present invention is to provide a container with a plug for ensuring the instantaneous and exact delivery or discharge of a predetermined quantity of any liquid contained in a container or recipient on which it is fitted. A typical application of the device is for the dosing and distribution of quantities of oil which it is desired to mix in a regular manner to petrol used for feeding engines of motor vehicles. This particular application is given by way of example in the description without obviously intending to limit to this particular case or to this liquid the use of the dose-delivering plug.

Cans usually sold in commerce are frequently supplied with a movable recipient with which it is possible to manage obviously to measure and pour out the quantity of oil which is suitable. But the inconvenience and the various manipulations necessary are numerous: time is lost, oil spilt, clothes, covers, body work spotted, the cans and measures become greasy and dirty.

The dosing plug constructed according to the features of the invention hereinafter set out permits of eliminating the whole of the annoyances referred to above and ensures the rapid distribution of the exact and predetermined quantities of oil without any manipulation of the measuring medium and avoids any loss or overflow of liquid and any filth due to the fact that the oil is measured and distributed through the action or effect of a pressure created inside the can or by an external traction force without it being necessary to touch the dosing means itself.

In the drawing a method of construction of the dosing plug has been illustrated by way of example and in this drawing:

Fig. 1 represents in vertical section a dosing or dosage plug;

Figs. 2, 3, 4 indicate diagrammatically the stages of operation of the dosage plug;

Figs. 5 and 6 show constructions having auxiliary operating members;

Fig 7 is a reduced elevation of a can embodying my invention with a portion broken away to show the interior.

The dosage plug is, generally speaking, but in no way to be construed as a limitation, intended to be secured to the short tube (nozzle) of oil receptacles that is cans of oil as sold generally in the trade, by soldering, screw-threading tightening thereon or in any other manner of fixing before or after the filling of such recipients. It consists of a stationary tubular member 1 tightened at 2 to the edge of the neck of the can 3, a suitable washer 4 being interposed to ensure tightness or impermeability. The tightening of this member 1 which carries all the movable elements of the dosage plug, can be effected after filling according to the directions indicated in the French patent specification No. 752,242 dated March 10, 1933. In the manner the dosage plug is fitted to the recipient in a durable and tight manner and a second filling of the said recipient with a liquid other than the original liquid is rendered impossible by reason of the fact that on the one hand the dosage plug will not permit of the refilling and on the other hand it cannot be separated from the recipient except by damaging the securing means.

The member 1 is obturated by a movable plug 5 which can be screw-threaded as is shown in Fig. 1 but which can equally well be otherwise secured as for example by a set of pins and grooves in the form of an incline which also permit of an energetic closing, or any other appropriate means. The tightness of the plug is increased by a washer 6.

Inside this member 1 which is stationary, and the bore of which is perfectly cylindrical, there slides with slight friction a tube 7 having ports 8 and 9 which open into an internal chamber 10 limited by two transverse walls or partitions 11 and 12. The tube 7 terminates at its upper part in a small collar 13 which bears, through the pressure of the plug 5 on the washer 6 while at its lower part it is prolonged in such a manner as to retain over the length necessary for its longitudinal displacement, the diameter corresponding to the bore of the part 1; it then has a portion 14 of larger diameter which serves to limit the movement by bearing against the internal face of said part 1 (Fig. 4).

In certain cases it is possible to provide a flat washer or joint between the two bearings. The part 14 of the tube 7 terminates in a crown 15 of sufficient diameter to serve as a bearing point for the spring 16 interpolated between the parts 1 and 7 for the purpose of constantly returning this latter to the position represented in Figures 1 and 2.

The dosage plug is generally adapted for use on cans of oil of current manufacture the lateral walls of which are very thin and become always deformed in the course of assembly or otherwise which causes the internal volume to be varied by tightening the can by hand to bring the two walls as close as possible together. It is moreover possible, during manufacture to introduce into the can a light spring S arranged between the two surfaces to hold them normally outwardly curved.

In action the dosage plug fitted under these circumstances operates effectively through the considerable pressure which occurs in the can of oil when the lateral walls are sharply pressed together or towards each other.

The plug 5 having been removed the parts of the dosage plug occupy the relative positions shown in Figures 1 and 2.

The external orifice of the tube 7 is placed above or even in the opening of the petrol tank into which it is required to pour a certain quantity of oil. The can being tilted or even held upside down, the oil penetrates into the chamber 10 of the tube 7 through the openings 9 provided in the bore of the part 1 and cannot run out therefrom because the orifices 8 are obturated by the walls of this self-same part (Fig. 2). The chamber 10 thus filled therefore determines the volume which is to be discharged at each operation.

The lateral walls are then sharply pressed by hand towards each other and their movement, diminishing the volume of the can, creates a pressure which acts over the whole of the inner surface. The wall 11 receives a proportional thrust at its surface and the tube 7 is strongly displaced towards the exterior in spite of the presence of the spring 16.

From the start of the movement the orifices 9 are obturated by penetrating into the bore 1. At this moment the orifices 8 are still obturated by the same bore (Fig. 3). The chamber 10 is therefore completely filled with oil.

The movement of the tube 7 continues and the orifices 8 are uncovered (Fig. 4) the oil contained in the chamber thus being enabled to run out into the petrol reservoir or tank.

When the operation is terminated the walls of the can are released, the spring 16 sharply returns the piece or member 7 to its original position and the cycle of operations recommences without any manipulation of the dosage and distributor means.

Experience has shown that the spring 16 can often be omitted and numerous applications can be produced without the need of a spring.

On the other hand, in the case where the conditions to be fulfilled differ through the application of the device to rigid recipients or for any other reason, it is possible to add to the movable tube 7 means permitting of its being hand operated. Two methods of construction of this hand manipulation are shown in Figures 5 and 6.

In the example indicated in Figure 5 two appendixes or limbs 17 are fitted to the collar 13 of the tube 7 and pass freely in openings formed in the end part of the member 1, which is in consequence modified in form. The lower extremities of the limbs 17 which are level with the bottom of the can when the dosage means are returned inwardly, are provided with two buckles or rings 18 in which it is easy to insert two fingers in order to the direct movement of the tube 7 previously brought about by the internal pressure of the liquid contained in the can.

The method of construction according to Figure 6 comprises a system of levers arranged at the inside of the can during the manufacture thereof and which ensure the movement of the tube by mechanical means.

The lever systems 19 articulated at 20, 21 and 22 are mounted on a common axis 23 and pass from the position indicated in full lines to the position indicated in dot and dash lines when pressure is exerted on the knobs 24 secured to the walls 25 of the can.

In this movement the path traversed by the knobs 24 is reduced in conformity with the ratios of the lever arms and the tube 7 travels a distance necessary for the operation above mentioned beneath the action of the said levers 19.

It is also possible to produce a pressure within the recipient by means of a hollow rubber ball or pump B, such as shown in Fig. 1. The orifice can ordinarily be closed by an appropriate stopper, which is supplied at a given moment by said rubber ball.

As it is shown in Fig. 4 the part 1 is provided with a collar having for its object to collect the liquid (oil) which is flowing over.

It is to be understood on the other hand that the constructions which have just been described constitute examples of construction and that the dosage plug could be actuated by means different to these described without thereby exceeding the scope of the invention.

The same applies to the accessories of all kinds which might be substituted for those which have been used for the constructions indicated in Figures 5 and 6.

I claim:—

1. A dispensing can including a substantially cylindrical nozzle, a measuring valve slidably carried in said nozzle, said valve comprising a substantially cylindrical member having a length greater than that of said nozzle, a pair of transverse partitions in said valve, said partitions being spaced apart a distance less than the length of said nozzle, an inlet opening in said valve intermediate said partitions and adjacent the lowermost partition, an outlet opening in said valve intermediate said partitions and adjacent the uppermost partition, a portion of said valve below the lower partition being formed to provide a stop for limiting the outward movement of said valve, the lower end of said valve being upset to form an annular flange providing a spring seat, and a helical spring surrounding said valve and having one end seating on said flange and the other end seating against the top of said can, said spring comprising means for normally retaining said valve at its innermost limit.

2. A dispensing can including a substantially cylindrical nozzle, a fluid pressure actuated hollow measuring valve slidably mounted in said nozzle, said valve being formed to provide filling and discharge openings therein, means limiting the sliding movement of said valve in both directions, said valve being adapted to be filled when positioned at its innermost limit and discharged when slid to its outermost limit, means normally retaining said valve at its innermost limit, and said can being formed to provide means for raising the air pressure therein whereby to actuate said valve to its outermost limit against the action of said retaining means.

3. The structure of claim 2, said pressure raising means comprising at least one yieldable side wall adapted to be pressed inwardly to compress the air in said can, and spring means within said can operable to resist pressure on said side wall.

4. A dispensing can including a substantially cylindrical nozzle, a hollow measuring valve slidably mounted in said nozzle, said valve being formed to provide filling and discharge openings therein, means limiting the sliding movement of said valve in both directions, said valve being adapted to be filled when positioned at its innermost limit and discharged when slid to its outermost limit, means normally retaining said valve at its innermost limit, mechanical valve actuating means within said can, portions of said actuating means engaging said valve, other portions of said actuating means engaging opposite side walls of said can, said actuating means being operable to slide said valve to its outermost limit by the application of pressure to said opposite side walls of said can.

5. A dispensing can including a substantially cylindrical nozzle, a hollow measuring valve slidably mounted in said nozzle, said valve being formed to provide filling and discharge openings therein, means limiting the sliding movement of said valve in both directions, said valve being adapted to be filled when positioned at its innermost limit and discharged when slid to its outermost limit, means normally retaining said valve at its innermost limit, valve actuating means within said can, said actuating means comprising a pair of articulated levers, the upper ends of said levers being in operative engagement with opposite side walls of said can, said levers being operable to slide said valve to its outermost limit by the application of pressure to said opposite side walls of said can.

6. The structure of claim 2, said means for raising the air pressure in said can comprising a pump.

7. A dispensing can including a nozzle, a hollow measuring valve movably carried within said nozzle, said valve being adapted to receive a measured portion of the can contents in the hollow thereof, said valve being movable to a dispensing position, said valve normally being retained at a closed position, said valve being adapted to deliver said measured portion of the contents of said can when moved to said dispensing position, and means responsive to pressure upon opposite side walls of said can for actuating said valve to said dispensing position.

8. The structure of claim 7, and said valve being slidably carried within said nozzle.

ROBERT SCHUBENEL.